United States Patent

Minoji

[11] Patent Number: 5,921,024
[45] Date of Patent: Jul. 13, 1999

[54] METHOD OF NURSERY TREE HYDROPONICS AND FERTILIZER FOR NURSERY TREE HYDROPONICS

[75] Inventor: Tadataka Minoji, Shimane, Japan

[73] Assignee: Yugengaisya Syoryokuringyokenkyusyo, Urayasu, Japan

[21] Appl. No.: 08/945,423

[22] PCT Filed: Apr. 19, 1996

[86] PCT No.: PCT/JP96/01073

§ 371 Date: Oct. 20, 1997

§ 102(e) Date: Oct. 20, 1997

[87] PCT Pub. No.: WO96/32835

PCT Pub. Date: Oct. 24, 1996

[30] Foreign Application Priority Data

Apr. 20, 1995 [JP] Japan ................................. 7-117676

[51] Int. Cl.⁶ .......................... A01G 31/00; A01G 29/00; A01B 79/00

[52] U.S. Cl. ................. 47/62 R; 47/59; 47/58; 47/48.5

[58] Field of Search ................. 47/62 R, 58, 59, 47/77, 48.5, DIG. 10, 61, 65.5, 65.7, 66.1, 66.2, 66.3, 66.7; 71/52, 35

[56] References Cited

U.S. PATENT DOCUMENTS

| | | | |
|---|---|---|---|
| 2,223,316 | 11/1940 | Ellis et al. | 71/2 |
| 2,270,518 | 1/1942 | Ellis et al. | 71/1 |
| 2,498,480 | 2/1950 | Bierlich et al. | 71/23 |
| 4,086,725 | 5/1978 | Li | 47/61 |
| 4,334,908 | 6/1982 | Duchateau et al. | 71/52 |
| 4,469,503 | 9/1984 | Stockel | 71/24 |
| 4,510,712 | 4/1985 | Whitcomb | 47/66 |
| 4,707,176 | 11/1987 | Durham | 71/23 |
| 4,720,935 | 1/1988 | Rogers et al. | 47/56 |
| 5,020,273 | 6/1991 | Johnson | 47/61 |
| 5,037,470 | 8/1991 | Matzen et al. | 71/52 |
| 5,049,505 | 9/1991 | Sei | 435/311 |
| 5,094,680 | 3/1992 | Lee | 71/33 |
| 5,106,405 | 4/1992 | Goto | 71/7 |
| 5,114,457 | 5/1992 | Evans | 71/23 |
| 5,224,291 | 7/1993 | Sherfield | 47/62 |
| 5,352,264 | 10/1994 | Medina Vega | 71/23 |
| 5,385,589 | 1/1995 | Kratky | 47/58 |
| 5,720,793 | 2/1998 | Kato et al. | 71/16 |

FOREIGN PATENT DOCUMENTS

| | | | |
|---|---|---|---|
| 0355250 | 2/1990 | European Pat. Off. | 47/59 CO |
| 25991423 | 6/1987 | France | 47/59 C |
| 0065004 | 5/1977 | Japan | 47/59 CO |
| 63317027 | 12/1988 | Japan | 47/59 CO |
| 0103051 | 1/1989 | Japan | 47/59 CO |
| 0041283 | 9/1989 | Japan | 47/59 CO |
| 2124037 | 5/1990 | Japan | 47/59 CO |
| 02186918 | 7/1990 | Japan | 47/59 CO |
| 404108316 | 4/1992 | Japan | 47/59 E |
| 405227831 | 9/1993 | Japan | 47/59 E |
| 406153689 | 3/1994 | Japan | 47/59 CO |
| 406233626 | 8/1994 | Japan | 47/59 CO |
| 07-28616 | 4/1995 | Japan . | |
| 384199 | 10/1973 | U.S.S.R. | 47/59 CO |
| 654600 | 6/1951 | United Kingdom | 47/59 CO |

OTHER PUBLICATIONS

1. The Editorial Department of Cultivation and Horticulture, "Supplement of Cultivation and Horticulture New Technology of Hydroponics," Seibundo Shinkosha, Sep. 25, 1986.

Primary Examiner—Michael J. Carone
Assistant Examiner—Fredrick T. French, III
Attorney, Agent, or Firm—Smith, Gambrell & Russell; Beveridge, DeGrandi, Weilacher & Young

[57] ABSTRACT

A raising seedling pot provided with passing parts on the side face and the bottom and capable of undergoing fracture is filled with a culture medium comprising a mixture of smoked charcoal or rice hulls with a water holding material, the raising seedling pot is immersed in a culture solution containing 1,000 to 1,800 ppm of a nitrogen component, 600 to 1,000 ppm of a phosphoric acid component, 1,500 to 3,500 ppm of a potassium component, 300 to 500 ppm of a magnesia component, and 900 to 1,400 ppm of a lime component, and nursery trees are raised using this culture solution.

Thus, nursery tree growth is favorably affected and remarkably accelerated even after the transplantation of the nursery tree into soil. Moreover, it is possible to thus establish advantageous effects such that the tree raised by this method has false annual rings and is expected to be useful as a wooden board material with excellent density and color, and the method is suitable particularly for the cultivation of nursery trees for forestation.

7 Claims, No Drawings

METHOD OF NURSERY TREE HYDROPONICS AND FERTILIZER FOR NURSERY TREE HYDROPONICS

TECHNICAL FIELD

The present invention relates to a method of nursery tree hydroponics and a fertilizer for nursery tree hydroponics, and more particularly to a method of nursery tree hydroponics and a fertilizer for nursery tree hydroponics for use in forestation.

BACKGROUND ART

Hydroponics is a technique for growing vegetables and the like using a culture solution rather than using soil. It is widely used in the production of salad greens, trefoil, and other green vegetables, as well as of melons, tomatoes, and other fruits and vegetables.

As disclosed in Japanese TOKKYO-KOKAI-KOHO (18-month Publication of Unexamined Patent Application) Heisei 3(1992)-151814, forestation techniques which employ seedlings grown using liquid fertilizers have also been developed.

Culture media, culture solutions, and other conditions are being studied with regard to various types of plants targeted for hydroponic culture.

However, it cannot be said that there has been adequate research conducted with regard to conditions especially adapted for hydroponic cultivation of nursery trees for use in forestation with cryptomeria (*sugi*), cypress (*hinoki*), and the like.

Accordingly, it is an object of the present invention to provide a method of nursery tree hydroponics and a fertilizer for nursery tree hydroponics which are especially adapted for growing seedlings for use in forestation with cryptomeria, cypress, and the like.

SUMMARY OF THE INVENTION

The means employed in the present invention for achieving this object are as follows.

Firstly, a method of nursery tree hydroponics comprising the steps of: filling a raising seedling pot which is provided with passing parts on the side face and the bottom and capable of undergoing fracture with a culture medium comprising a mixture of smoked charcoal or rice hulls with a water holding material; immersing the raising seedling pot in a culture solution containing 1,000 to 1,800 ppm of a nitrogen component, 600 to 1,000 ppm of a phosphoric acid component, 1,500 to 3,500 ppm of a potassium component, 300 to 500 ppm of a magnesia component, and 900 to 1,400 ppm of a lime component; and raising the nursery tree using this culture solution.

Secondly, a method of nursery tree hydroponics comprising the steps of: filling a raising seedling pot which is provided with passing parts on the side face and the bottom and capable of undergoing fracture with a culture medium comprising a mixture of smoked charcoal or rice hulls with a water holding material; immersing the raising seedling pot in a culture solution containing 1,000 to 1,800 ppm of a nitrogen component, 600 to 1,000 ppm of a phosphoric acid component, 1,500 to 3,500 ppm of a potassium component, 300 to 500 ppm of a magnesia component, 9 to 11 ppm of a manganese component, 9 to 11 ppm of a boron component, 28 to 32 ppm of a iron component, 4 to 6 ppm of a copper component, 4 to 6 ppm of a zinc component, 4 to 6 ppm of a molybdenum component, and 900 to 1,400 ppm of a lime component; And raising the nursery tree using this culture solution.

Thirdly, a fertilizer for nursery tree hydroponics, containing 1,000 to 1,800 ppm of a nitrogen component, 600 to 1,000 ppm of a phosphoric acid component, 1,500 to 3,500 ppm of a potassium component, 300 to 500 ppm of a magnesia component, and 900 to 1,400 ppm of a lime component.

Fourthly, a fertilizer for nursery tree hydroponics, containing 1,000 to 1,800 ppm of a nitrogen component, 600 to 1,000 ppm of a phosphoric acid component, 1,500 to 3,500 ppm of a potassium component, 300 to 500 ppm of a magnesia component, 9 to 11 ppm of a manganese component, 9 to 11 ppm of a boron component, 28 to 32 ppm of a iron component, 4 to 6 ppm of a copper component, 4 to 6 ppm of a zinc component, 4 to 6 ppm of a molybdenum component, and 900 to 1,400 ppm of a lime component.

Fifthly, a method of nursery tree hydroponics comprising the steps of filling a raising seedling pot which is provided with passing parts on the side face and the bottom and capable of undergoing fracture with a culture medium comprising a mixture of smoked charcoal or rice hulls with a water holding material; immersing the raising seedling pot in a culture solution containing 1,100 to 1,300 ppm of a nitrogen component and favorably 700 to 900 ppm of a phosphoric acid component, 1,700 to 1,900 ppm of a potassium component, 300 to 500 ppm of a magnesia component, 9 to 11 ppm of a manganese component, 9 to 11 ppm of a boron component, 28 to 32 ppm of a iron component, 4 to 6 ppm of a copper component, 4 to 6 ppm of a zinc component, 4 to 6 ppm of a molybdenum component, and 900 to 1,100 ppm of a lime component; and raising the nursery tree using this culture solution.

Sixthly, a fertilizer for nursery tree hydroponics containing 1,100 to 1,300 ppm of a nitrogen component and favorably 700 to 900 ppm of a phosphoric acid component, 1,700 to 1,900 ppm of a potassium component, 300 to 500 ppm of a magnesia component, 9 to 11 ppm of a manganese component, 9 to 11 ppm of a boron component, 28 to 32 ppm of an iron component, 4 to 6 ppm of a copper component, 4 to 6 ppm of a zinc component, 4 to 6 ppm of a molybdenum component, and 900 to 1,100 ppm of a lime component.

Any nursery tree suitable for use in forestation may be raised using the hydroponics which pertain to the present invention. Examples are cryptomeria, cypress, fir, silver fir, *Quercus acutissima*, Japanese oak, hiba arborvitae, paulownia, lauan, and hemlock spruce.

Using the method of nursery tree hydroponics and fertilizer for nursery tree hydroponics which pertain to the present invention, the growth of the nursery tree is favorably affected and remarkably accelerated even after the transplantation of the nursery tree into soil. Moreover, it is possible to thus establish advantageous effects such that the tree raised by this method has false annual rings (*ginenrin*) and is expected to be useful as a wooden board material with excellent density and color. Thus, the method is suitable particularly for the cultivation of nursery trees for forestation.

BEST MODE FOR CARRYING OUT THE INVENTION

An embodiment of the present invention will be described below; however, the present invention is not limited to this embodiment.

In this embodiment, cryptomeria nursery trees were raised under ordinary hydroponic conditions using a raising seedling pot of box form filled with a culture medium of smoked charcoal or rice hulls with a water holding material, by setting the raising seedling pot in a hydroponic culture water container located inside a greenhouse.

The hydroponic culture water container of this embodiment comprised a shallow rectangular excavation covered with waterproof sheeting and an assembly of board materials for forming a water container. The short board material on one side was provided with a culture solution inlet, and a culture solution outlet was provided at the other side.

A culture solution feed pump was placed at the culture solution inlet side, and the culture solution supplied from the culture solution inlet side by the pump was removed from the outlet side to keep the culture solution flowing constantly and to ensure that there was sufficient oxygen dissolution in the culture solution.

In this embodiment, a raising seedling pot provided with passing parts of slit form on the side face and the bottom and capable of undergoing fracture was used.

The raising seedling pot was filled with an insoluble culture medium consisting of smoked charcoal or the like with a water holding material, and the cryptomeria nursery tree seeds were then planted.

A plurality of raising seedling pots containing planted seeds were placed at intervals of about 5 cm in the hydroponic culture water container, which was supplied with culture solution, and immersed in the culture solution such that it came to a level approximately one-third the height of the raising seedling pots.

The culture solution employed in this embodiment was prepared using a fertilizer for nursery tree hydroponics containing the following components.

In this embodiment, the fertilizer for nursery tree hydroponics was prepared such that the nitrogen component in the aqueous solution was approximately 1,200 ppm, the phosphoric acid component ($P_2O_5$) was approximately 800 ppm, the potassium component ($K_2O$) was approximately 1,800 ppm, the magnesia component (MgO) was approximately 400 ppm, the manganese component (MnO) was approximately 10 ppm, the boron component ($B_2O_3$) was approximately 10 ppm, the iron component (Fe) was approximately 30 ppm, the copper component (Cu) was approximately 5 ppm, the zinc component (Zn) was approximately 5 ppm, the molybdenum component (Mo) was approximately 5 ppm, and the lime component (CaO) was approximately 1,000 ppm.

Dissolved 6.0% ammoniacal component and 24.0% nitrate component granular solid fertilizers supplied the nitrogen.

Nursery trees raised for approximately three months with the culture solution described above exhibited excellent root growth compared to trees raised for an equivalent period in soil, and their root mass was six or more times heavier.

Cryptomeria nursery trees hydroponically cultured using the aforementioned culture solution were transplanted to an actual site scheduled for forestation.

Approximately three years after the nursery trees had been transplanted, they exhibited excellent growth superior to that of nursery trees grown by ordinary soil culture.

Nursery trees raised in accordance with the present invention were cut three years after transplant; compared to trees grown by ordinary soil culture, they had numerous densely-grained false annual rings of almost perfectly circular shape, and had a cypress color. The results of actual strength tests demonstrated excellent compressive strength exceeding that required by construction standards law, and they appeared promising as a wooden board material with excellent density and color.

According to Takeshi Uwamura, "Mokuzai no Jissai Chishiki, 3d ed." (Toyo Keizai Shinpo Co., Ltd., published September 1988), p. 41, "when growing conditions vary significantly within a given year, in some cases, annular ring-like tissue is produced in addition to the true annular ring, and this is termed a false annular ring. In many cases, it is not perfectly round"; thus, false annular rings (*ginenrin*) are not commonly seen in ordinary wood materials, and in virtually no case is the shape of the false annular rings that do occur perfectly round, as they are in wood materials produced in accordance with the present invention.

I claim:

1. A method of nursery tree hydroponics comprising the steps of:

filling a raising seedling pot, which is provided with passing parts of slit form on a side face and the bottom and capable of undergoing fracture, with a culture medium comprising a mixture of smoked charcoal or rice hulls with a water holding material;

immersing the raising seedling pot in a culture solution containing 1,000 to 1,800 ppm of a nitrogen component, 600 to 1,000 ppm of a phosphoric acid component, 1,500 to 3,500 ppm of a potassium component, 300 to 500 ppm of a magnesia component, and 900 to 1,400 ppm of a lime component; and raising a nursery tree using this culture solution.

2. The method defined in claim 1 wherein said method promotes false annular rings in trees.

3. The method defined in claim 1, wherein said nursery tree is a member selected from the group consisting of cryptomeria, cypress, fir, silver fir, *Quercus acutissima*, Japanese oak, hiba arborvitae, paulownia, luaun, and hemlock spruce.

4. The method defined in claim 1 further comprising after the immersing step, flowing the culture solution through an inlet of a container that contains the raising seedling pots, and removing culture solution from an outlet of said container.

5. A method of nursery tree hydroponics comprising the steps of:

filling a raising seedling pot, which is provided with passing parts of slit form on a side face and the bottom and capable of undergoing fractures with a culture medium comprising a mixture of smoked charcoal or rice hulls with a water holding material;

immersing the raising seedling pot in a culture solution containing 1,000 to 1,800 ppm of a nitrogen component, 600 to 1,000 ppm of a phosphoric acid component, 1,500 to 3,500 ppm of a potassium component, 300 to 500 ppm of a magnesia component, 9 to 11 ppm of a boron component, 28 to 32 ppm of an iron component, 4 to 6 ppm of a copper component, 4 to 6 ppm of a molybdenum component, and 900 to 1,400 ppm of a lime component; and raising a nursery tree using this culture solution.

6. A fertilizer for nursery tree hydroponics, containing 1,000 to 1,800 ppm of a nitrogen component, 600 to 1,000 ppm of a phosphoric acid component, 1,500 to 3,500 ppm of a potassium component, 300 to 500 ppm of a magnesia component, and 900 to 1,400 ppm of a lime component.

7. A fertilizer for nursery tree hydroponics, containing 1,000 to 1,800 ppm of a nitrogen component, 600 to 1,000 ppm of a phosphoric acid component, 1,500 to 3,500 ppm of a potassium component, 300 to 500 ppm of a magnesia component, 9 to 11 ppm of a manganese component, 9 to 11 ppm of a boron component, 28 to 32 ppm of a iron component, 4 to 6 ppm of a copper component, 4 to 6 ppm of a zinc component, 4 to 6 ppm of a molybdenum component, and 900 to 1,400 ppm of a lime component.

* * * * *